Figure 1:
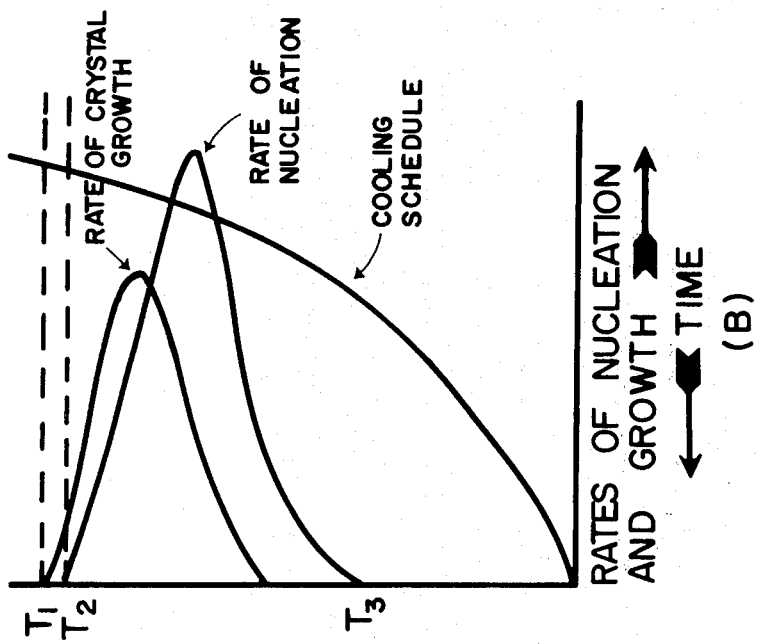
Figure 1:
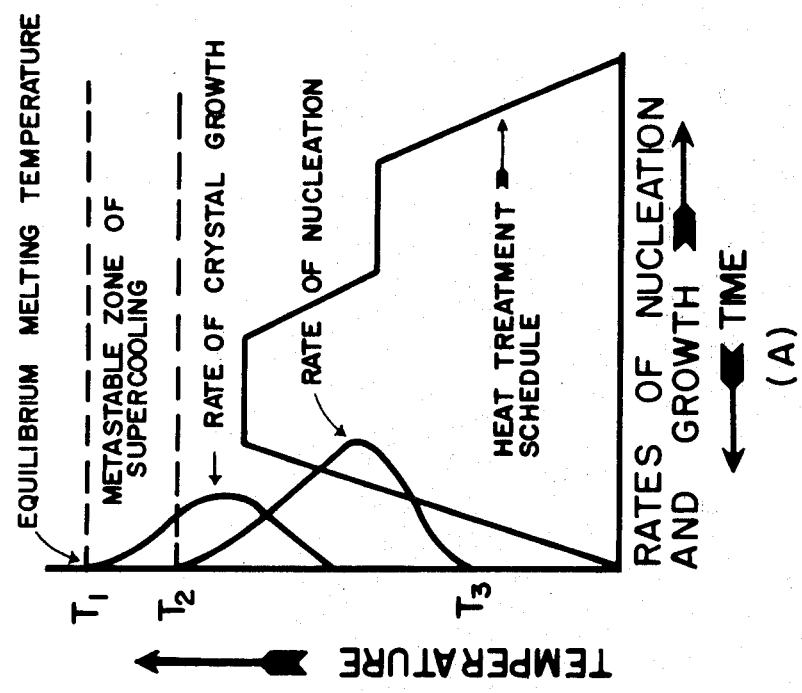

United States Patent [19]

Flannery et al.

[11] 3,985,534

[45] Oct. 12, 1976

[54] SPONTANEOUSLY-FORMED FLUORMICA GLASS-CERAMICS

[75] Inventors: James E. Flannery; Dale R. Wexell, both of Corning, N.Y.

[73] Assignee: Corning Glass Works, Corning, N.Y.

[22] Filed: Mar. 19, 1975

[21] Appl. No.: 559,732

[52] U.S. Cl................................... 65/33; 156/39.7
[51] Int. Cl.²...................... C03B 32/00; C03C 3/22
[58] Field of Search................. 106/39.6, 39.7, 39.8; 65/33

[56] References Cited
UNITED STATES PATENTS

| | | | |
|---|---|---|---|
| 3,667,973 | 6/1972 | Flannery | 106/39.7 |
| 3,804,608 | 4/1974 | Gaskell et al. | 106/39.7 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

The instant invention involves the production of articles exhibiting an internal microstructure and physical characteristics like those of glass-ceramic bodies but which can be formed spontaneously from a molten glass. Hence, in contrast to the production of conventional glass-ceramic articles, no heat treatment of a parent or precursor glass body is required to cause crystallization in situ to occur. More particularly, the instant invention is concerned with the manufacture of highly crystalline glass-ceramic articles, having compositions within the $Li_2O-Na_2O-Al_2O_3-MgO-SiO_2-F$ system, wherein a fluormica constitutes the predominant crystal phase, which can be formed spontaneously from a molten glass batch.

3 Claims, 2 Drawing Figures

SPONTANEOUSLY-FORMED FLUORMICA GLASS-CERAMICS

United States applications Ser. Nos. 559,725 and 559,787, filed concurrently herewith by D. G. Grossman, describe the production of spontaneously-formed glass-ceramic articles wherein a fluormica comprises the principal crystal phase. United States application Ser. No. 559,786, filed concurrently herewith by G. H. Beall, discloses the manufacture of spontaneously-formed glass-ceramic articles wherein alpha-quartz solid solution constitutes the primary crystal phase. United States application Ser. No. 559,788, filed concurrently herewith by G. H. Beall, P. E. Blaszyk, and W. T. Brydges, III, discusses the formation of spontaneously-formed glass-ceramic articles wherein beta-spodumene solid solution comprises the predominant crystal phase. United States applications Ser. Nos. 559,731 and 559,730, filed concurrently herewith by H. L. Rittler describe the production of spontaneously-formed glass-ceramic articles wherein BaO and/or SrO-$Fe_2O_3$-$SiO_2$ solid solution and carnegieite and/or nepheline solid solution, respectively, constitutes the principal crystal phase. United States applications Ser. Nos. 559,789, 559,726, and 559,727, filed concurrently by D. G. Grossman, describe the manufacture of spontaneously-formed glass-ceramic articls wherein mullite, celsian, and beta-spodumene solid solution, respectively, comprises the primary crystal phase.

The basis for the field of glass-ceramics resides in U.S. Pat. No. 2,920,971. The process for the manufacture of conventional glass-ceramic articles is explained in that patent as demanding the controlled heat treatment of a parent or precursor glass body at elevated temperatures. Customarily, the method for making glass-ceramic bodies contemplates three general steps. First, a glass-forming batch normally containing a nucleating agent, is melted. Second, this melt is cooled to a temperature at least within and, more commonly, below the transformation range to produce an essentially crystal-free glass and a body of a desired geometry shaped therefrom. Third, this glass body is heated to a temperature above the transformation range thereof to cause the development of crystals in situ. [The transformation range has been defined as that temperature at which a molten mass is converted into an amorphous solid, and has customarily been deemed to lie in the vicinity of the annealing point of a glass.]

In the normal commercial practice, the third or crystallization step described above is divided into two parts. First, the precursor glass body is heated to a temperature slightly above the transformation range and is maintained thereat for a sufficient period of time to secure substantial nucleation. Therefore, the nucleated body is raised to a still higher temperature, normally above the softening point of the parent glass, and held thereat for a length of time sufficient to cause the growth of crystals on the nuclei.

This carefully-defined heat treatment of the glass body leads to the formation of a homogeneously crystallized article wherein the crystals are relatively uniformly fine-grained. For a more detailed description of the micro-structure and the means of production of the conventional glass-ceramic body, reference is again made to U.S. Pat. No. 2,920,971, supra.

In the commercial manufacture of glass articles, it has frequently been observed that crystallization will take place during the cooling and forming of the molten batch. The crystallization commences at the surface of the melt or at the interface between the molten batch and a forming element, and then grows inwardly into the glass body. This phenomenon has been characterized as "normal" devitrification and is commonly regarded as undesirable because the final microstructure is composed of non-uniformly sized, relatively coarse-grained crystals which are usually oriented in a plane perpendicular to the surface. Such microstructure customarily results in a mechanically weak article.

The mechanism of "normal" devitrification is basically different from that intrinsic to the production of glass-ceramic articles because it is founded upon crystallization occurring at or near the liquidus of the molten batch. A further example of crystallization taking place at temperatures approaching or coincident with the liquidus can be seen in the fusion casting of refractory ceramic materials. Contrary to those situations, the formation of glass-ceramic articles by means of the controlled heat treatment of parent glass bodies utilizes temperatures substantially below the liquidus, thereby providing a larger degree of supercooling, such that the growth of crystals occurs in the glass at a much higher viscosity level and, in so doing, permits time to play an important role in crystal growth.

The instant invention involves spontaneously-formed glass-ceramic articles. Hence, certain compositions within a narrowly-defined region of the $Li_2O$-$Na_2O$-$Al_2O_3$-$MgO$-$SiO_2$-F field and also containing $B_2O_3$ and/or $MoO_3$ and/or $WO_3$, when cooled from a molten batch, can produce bodies consisting essentially of relatively uniformly sized crystals homogeneously dispersed within a glassy matrix. Such bodies, without further heat treatment, are highly crystalline, i.e., greater than 50% by volume crystalline and customarily greater than 75% by volume crystalline, and the crystals, themselves, consist primarily of fluormica laths and platelets having diameters less than about 5 microns, with the majority being less than about one micron and with aspect ratios normally being greater than three.

FIG. 1 furnishes a graphic explanation of the differences in crystallization mechanism which exist between the spontaneously-formed glass-ceramic bodies of the instant invention and the classic glass-ceramic articles. It is believed that the most vital key to understanding these differences resides in the overlap observed existing in the rate curves for nucleation and crystallization set out therein. Thus, FIG. 1 points out that there is a range of temperatures ($T_1$-$T_2$) below the equilibrium melting temperature of the viscous liquid $T_1$, wherein nuclei do not develop at a perceptible rate. This temperature interval has been denominated the metastable zone of supercooling. In the conventional glass-ceramic compositions, no crysals form at or immediately below this metastable zone inasmuch as the rate of nucleation is so very slow that no growth sites are supplied for crystals. Therefore, in the conventional glass-ceramic systems, nucleation takes place within the $T_2$-$T_3$ temperature interval.

FIG. 1(A) illustrates the crystallization mechanism involved in the production of conventional glass-ceramic articles. As is graphically pictured there, crystallization is achieved by first reheating the supercooled liquid, i.e., the precursor glass body, into the zone of maximum nucleation and maintaining the body thereat for a sufficient length of time to obtain substantial nucleation. Subsequently, the glass body is heated into the range of maximum crystal growth and held therewithin for a period of time adequate to attain the desired high crystallinity.

FIG. 1(B) pictorially represents the crystallization mechanism contemplated in the production of spontaneously-formed glass-ceramic articles of the instant invention. As can readily be observed, the metastable zone of supercooling is significantly narrower and the rates of nucleation and crystal growth substantially more rapid. Those factors give rise to a situation where nucleation and crystallization can take place at such a rapid rate immediately below the region of metastable supercooling that dwell periods of any consequence within those respective zones are not required. Therefore, such circumstances can result in the simple cooling of the melt providing a body having a relatively homogeneous crystalline microstructure. It will be self-evident, of course, that severe quenching of the molten batch through the respective nucleation and crystallization temperature intervals could allow insufficient time to produce the desired high crystalline microstructure.

U.S. Pat. No. 3,804,608 discloses a number of compositions which can be formed into glass-ceramic articles without employing the reheating step required in the production of conventional glass-ceramic bodies. However, although citation is made to compositions containing $Li_2O$, $Na_2O$, $Al_2O_3$, MgO, $SiO_2$, and F, the proportions employed of those ingredients are outside those found operable in the present invention and there is absolutely no mention of fluormica crystals. Furthermore, whereas fluorine is mentioned as an optional ingredient in the text of that specification and is reported as having been used in two of the working examples, there is no statement as to any particular utility therefor. In contrast thereto, the inclusion of fluorine in the instant invention is required to obtain the desired fluormica crystals.

Spontaneously-formed glass-ceramic articles containing fluormica as the predominant crystal phase can be produced from compositions consisting essentially, by weight on the oxide basis as calculated from the batch, of about 1–5% $Li_2O$, 3–6% $Na_2O$, 2–6% $Al_2O_3$, 4–25% MgO, 45–75% $SiO_2$, 3–7% F, and 5–10% $B_2O_3$ and/or 1.5–4.5% $MoO_3$ and/or $WO_3$. Laboratory experience has demonstrated that at least 10% MgO is required where $B_2O_3$ is present alone but the inclusion of $MoO_3$ and/or $WO_3$ in at least the minimum amount permits the attainment of the fluormica crystallization with less than 10% MgO.

X-ray diffraction studies of the crystal content have identified cristobalite (a polymorph of silica) as a minor phase and a complex fluormica phase believed to be most probably a magnesium and fluoride substituted sodium aluminosilicate, perhaps a sodium phlogopite solid solution, e.g., $NaMg_3AlSi_3O_{10}F_2$, or possibly related to paragonite, $NaAl_2(AlSi_3O_{10})(OH)_2$, as the predominant phase. Very minor amounts of other unidentifiable crystal phases have also been observed.

It is not known whether $B_2O_3$ enters into the fluormica structure but its presence is useful in reducing the surface tension of the melt, therby assisting rapid crystal growth, and in stabilizing the residual glass. The inclusion of $MoO_3$ and/or $WO_3$ is believed to nucleate the melt and lead to the growth of a minor molybdate and/or tungstate crystal phase as well as reducing the surface tension of the melt. $TiO_2$ and/or $ZrO_2$ can be added as secondary nucleants although their presence is generally not needed or desired. Various compatible metal oxides, such as the alkaline earth metal oxides and other divalent metal oxides can be included in minor amounts. $P_2O_5$ is commonly avoided since it appears to add to the residual glassy matrix. $As_2O_5$ and $Sb_2O_5$ may be present in their conventional capacity as fining agents. $As_2O_5$ has the additional ability to maintain $TiO_2$ in the oxidated state, thereby insuring a white appearance in the crystallized body. Nevertheless, the total of all such additions beyond $B_2O_3$, $MoO_3$, and $WO_3$ will most preferably be held below about 10%.

The table below reports a group of glass-forming compositions, expressed in weight percent on the oxide basis as calculated from the batch. Since it is not known with which cation(s) the fluorine is combined, it is simply recorded as fluoride (F) in accordance with conventional glass analysis practice. The actual batch ingredients can comprise any materials, either the oxide or other compounds, which, when melted together, will be converted into the desired oxide in the proper proportion. In the calculated compositions, $AlF_3$ and/or $MgF_2$ provided the fluoride content. Fluorine retention during melting was determined to be about 75%.

The batch ingredients were ballmilled together to assist in achieving a homogeneous melt and placed into a platinum crucible. After fitting with a cover, the crucible was introduced into an electrically fired furnace operating at about 1450°–1500° C. and held therewithin for times ranging from about 4–16 hours. Thereafter, the melt was poured into a graphite or steel mold to form a slab about 6 × 6 × ½ inches and allowed to cool in the ambient environment to about 875°–1050° C., as measured with an optical pyrometer, this cooling taking no more than about 60 seconds. Subsequently, the slab was transferred to an annealer operating at a temperature between about 800°–950° C.

The temperature of the melt was observed with an optical pyrometer during the time it was poured into the mold and the resultant slab transferred to the annealer. The molten batch appeared to stiffen in the manner of a normal glass melt until a temperature of about 875°–1050° C. was reached. At or about that temperature range, a hazy opalization took place at the edges of the slab and moved toward the center thereof. A wave of opaque crystallization followed closely behind. As was noted above, the inclusion of $B_2O_3$ is helpful in obtaining very rapid crystallization. It also appears to alleviate warping tendencies which have been observed as a result of the rapid crystallization.

It has been postulated that the opalization is brought about by means of a phase separation taking place, such as is commonly experienced in fluorine-containing glass systems. It is further believed that this phase separation increases the nucleation rate since, where no prior opalization is seen, the desired uniformly-sized fluormica crystals will not be developed. FIG. 1(B) provides a guide for understanding this phenomenon. Thus, as is illustrated therein, there must be a very high degree of nucleation at temperatures near or at the optimum growth temperature to secure the desired crystallization as the molten batch cools. Hence, this opalization, which occurs at about 100°–300° C. above the annealing point of the glass, supplies the required nucleation.

Nevertheless, although spontaneous opalization has been observed in many glasses, unless one of the amorphous phases involved in the opalization is at least partially unstable as a glass and crystallites of some types are precipitated to function as nuclei, there will be no spontaneous crystallization of the major glass components following the opalization. Whereas the mechanism underlying the extremely rapid and spontaneous growth of crystals is not fully comprehended, it is believed that crystallites are formed at temperatures well above the annealing point of the glass during or immediately after the opalization phenomenon, which then act as nuclei while the glass mass is still within the temperature interval of maximum crystal growth.

The rate of crystallization appears to be, in part at least a function of composition. Customarily, the most rapidly crystallizing compositions, i.e., those demonstrating the capability of crystallizing within a few minutes, contain low silica contents and/or contain $MoO_3$ and/or $WO_3$. Melt cooling rates between about 10°–1000° C./minute to the temperature at which the phase separation and concurrent opalization takes place, viz., about 875°–1050° C., depending upon composition, have been observed to be satisfactory. The temperature region in which crystallization normally occurs varies between about 750°–950° C.

Annealing times ranging from less than about a half hour to several hours have been found adequate to yield the desired fine-grained articles. Times longer than about 6 hours can be satisfactorily employed but, from a commercial point of view, are not viewed with much favor since such merely add to the cost of production. In general, annealing temperatures in excess of about 950° C. hazard deformation and slumping of the articles.

The table also reports the operating temperature (° C.) of the annealer into which samples of the individual compositions were placed.

perature to 300° C.) commonly range between about $60$–$90 \times 10^{-7}/°$ C.

The micas comprise a family of silicate minerals having a unique two-dimensional or sheet structure. Most naturally occurring micas are hydroxyl silicates, whereas micas produced synthetically have commonly involved the replacement of hydroxyl groups within the crystal structure with fluorine. These synthetic micas have been termed fluormicas because of that substitution. That terminology is utilized here.

Figure 2:
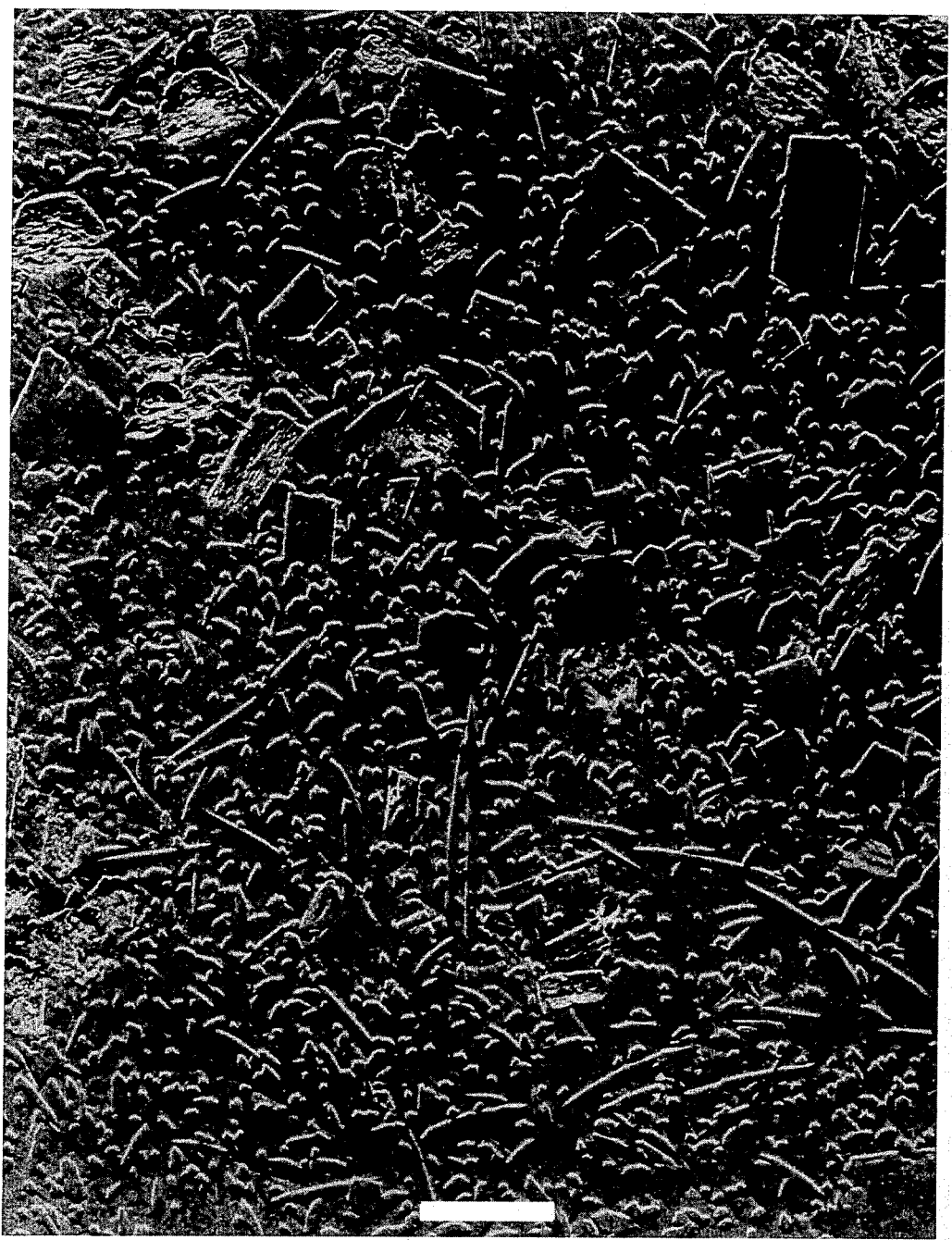

FIG. 2 is a replica electron micograph of the spontaneously-formed slab of Example 1 which is illustrative of the characteristic microstructure of the desired highly crystalline articles. The white bar at the base of the photograph represents a distance of one micron. The fluormica crystals comprise the predominant crystal phase with a minor amount of cristobalite constituting a second crystal phase. The crystal phases are seen to comprise over 75% by volume of the article. In Examples 12–16, a minor amount of $BaWO_4$ has also been identified by X-ray diffraction.

In summary, the process of the instant invention comprises four general steps. First, a glass-forming batch having a composition within the above-outlined operable ranges is melted. Second, the molten batch is simultaneously cooled to a temperature between about 100°–300° C. above the annealing point of the glass to obtain phase separation and nucleation therein and a glass body shaped therefrom. Third, the glass body is exposed to a temperature between the annealing point of the glass and the temperature of phase separation and nucleation for a period of time sufficient to cause crystallization of the desired fluormica phase. Fourth, the crystallized body is cooled to room temperature.

TABLE

|  | 1 | 2 | 3 | 4 | 5 | 6 | 7 | 8 |
|---|---|---|---|---|---|---|---|---|
| $SiO_2$ | 64.89% | 64.26% | 63.76% | 67.51% | 70.04% | 64.85% | 65.48% | 72.80% |
| $Al_2O_3$ | 3.61 | 3.58 | 3.54 | 3.64 | 3.78 | 2.13 | 3.81 | 3.92 |
| $B_2O_3$ | 5.83 | 5.77 | 5.72 | 6.07 | 6.30 | 7.69 | 5.98 | 6.55 |
| $Na_2O$ | 4.78 | 4.73 | 4.69 | 4.94 | 5.12 | 3.25 | 3.96 | 5.32 |
| $Li_2O$ | 1.99 | 1.97 | 1.96 | 2.07 | 2.15 | 1.08 | 2.00 | 2.23 |
| F | 4.70 | 4.65 | 4.61 | 4.89 | 5.08 | 2.89 | 7.32 | 5.27 |
| MgO | 14.20 | 13.57 | 13.47 | 10.88 | 7.53 | 18.11 | 11.45 | 3.91 |
| $TiO_2$ | — | 1.47 | — | — | — | — | — | — |
| $ZrO_2$ | — | — | 2.25 | — | — | — | — | — |
| Anneal. | 930° | 945° | 950° | 935° | 870° | 920° | 880° | — |

|  | 9 | 10 | 11 | 12 | 13 | 14 | 15 | 16 |
|---|---|---|---|---|---|---|---|---|
| $SiO_2$ | 57.77% | 49.39% | 66.20% | 65.98% | 68.48% | 71.18% | 70.28% | 71.64% |
| $Al_2O_3$ | 3.48 | 4.90 | 2.96 | 3.67 | 3.81 | 3.96 | 3.12 | 2.00 |
| $B_2O_3$ | 8.30 | 5.30 | 6.48 | — | — | — | — | — |
| $Na_2O$ | 5.85 | 4.44 | 5.40 | 5.36 | 5.56 | 5.78 | 5.69 | 3.86 |
| $Li_2O$ | 2.89 | 2.94 | 1.53 | 2.09 | 2.17 | 2.26 | 2.46 | 3.04 |
| F | 5.16 | 6.88 | 4.87 | 4.93 | 5.12 | 5.32 | 5.32 | 4.99 |
| MgO | 14.55 | 21.15 | 12.56 | 10.97 | 7.59 | 3.95 | 4.15 | 7.89 |
| $WO_3$ | — | — | — | 1.67 | 1.74 | 1.80 | 1.85 | 3.32 |
| BaO | 2.00 | 5.00 | — | 5.33 | 5.53 | 5.75 | 7.13 | 3.26 |
| Anneal. | 910° | 960° | 900° | 960° | 810° | 820° | 850° | 820° |

Examples 8 and 14 are illustrative of the utility of the inclusion of $WO_3$ in permitting the use of lower quantities of MgO while still achieving crystallization.

The outward appearance of the crystallized products is quite similar to that of conventional glass-ceramic articles, being opaque and white. The surface quality, especialy those compositions containing $B_2O_3$, demonstrated a satiny finish. In general, the crystalline bodies are quite strong with modulus of rupture values varying between about 15,000 35,000 psi on unbraided samples. The coefficients of thermal expansion (room tem- As has been stressed hereinabove, the second or phase separation step is of vital significance to the successful operation of the instant invention. Thus, the rate of cooling the melt must not be so rapid that there is not sufficient time for the required phase separation and nucleation to take place. With the composition ranges set out above, laboratory experience has indicated that cooling rates between about 10°–1000° C./minute will provide satisfactory phase separation and nucleation and that such phenomena occur at temperatures between about 875°–1050° C.

Inasmuch as the compositions of this invention crystallize extremely rapidly after the occurrence of the phase separation and nucleation, exposure times within the crystallization range of as brief as two minutes may be adequate to achieve high crystallinity, i.e., greater than 50% by volume of the body. Commonly, crystallization will take place at temperatures between about 750°–950° C. However, as was illustrated above in the working examples, ease in production has suggested that the glass body which has been phase separated and nucleated be placed into an annealer operating within or slightly above the crystallization range and cooled to room temperature therein. Annealing practices similar to those conventional in the glassmaking art are equally appropriate here.

Whereas the preferred practice of the invention contemplates crystallizing the article as the phase separated and nucleated glass body is cooled to room temperature, it is quite possible that the melt can be cooled to room temperature as such a rapid rate that phase separation and nucleation will take place, but the subsequent desired fluormica crystallization will not occur, so that the resultant body is essentially glassy. Nevertheless, crystallization of that glassy body can be attained by exposing it to a temperature within the crystallization range in like manner to that described above with respect to the crystallization secured as the molten batch is cooled to room temperature. Hence, again, it is the appearance of the opalization at temperatures above the crystallization range which is of critical importance to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism underlying this improvement in mechanical strength is not completely comprehended but is believed to involve the small amount of residual glass which is thought to be present as a continuous phase throughout the crystallized body. This theory of mechanism is deemed to be supported through a study of FIG. 2 wherein the residual glass is seen as small, essentially featureless, gray areas.

We claim:

1. A method for making a highly crystalline glass-ceramic article consisting essentially of fluormica crystals dispersed within a glassy matrix, said crystals constituting at least 50% by volume of said article, which comprises the steps of:
   a. melting a batch for a glass consisting essentially, by weight on the oxide basis as calculated from the batch, of about 1–5% $Li_2O$, 3–6% $Na_2O$, 2–6% $Al_2O_3$, 45–75% $SiO_2$, 3–7% F, and 5–10% $B_2O_3$ and/or 1.5–4.5% $MoO_3$ and/or $WO_3$;
   b. simultaneously cooling said melt at a rate between about 10°–1000° C./minute to a temperature about 875°–1050° C. to shape said melt into a glass body and obtain phase separation and nucleation therein;
   c. further cooling said shaped glass body and exposing said glass body to a temperature between about 750°–950° C. for a sufficient length of time to cause crystallization of the fluormica crystals in said glass body; and then
   d. cooling the crystallized body to room temperature.

2. A method according to claim 1 wherein said time sufficient to cause crystallization is at least about 2 minutes.

3. A method according to claim 1 wherein said crystallized body is cooled to room temperature by means of a quick chilling technique to thermally temper said body.

* * * * *

UNITED STATES PATENT AND TRADEMARK OFFICE
CERTIFICATE OF CORRECTION

PATENT NO. : 3,985,534
DATED : October 12, 1976
INVENTOR(S) : James E. Flannery and Dale R. Wexell It is certified that error appears in the above-identified patent and that said Letters Patent are hereby corrected as shown below:

Column 2, line 7, "uniformly sized" should be -- uniformly-sized --.

Column 2, line 10, "mechanically weak" should be -- mechanically-weak --.

Column 3, line 21, "high" should be -- highly --.

Column 5, line 67, "15,000   35,000" should be -- 15,000-35,000 --.

Signed and Sealed this

First Day of March 1977

[SEAL]

Attest:

RUTH C. MASON
Attesting Officer

C. MARSHALL DANN
Commissioner of Patents and Trademarks